(12) United States Patent
Alkan et al.

(10) Patent No.: US 10,419,037 B2
(45) Date of Patent: Sep. 17, 2019

(54) DYNAMIC NOISE MITIGATION DEVICE

(71) Applicant: PPC BROADBAND, INC., East Syracuse, NY (US)

(72) Inventors: Erdogan Alkan, Fayetteville, NY (US); Raymond W. Palinkas, Canastota, NY (US); Amos McKinnon, Liverpool, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 202 days.

(21) Appl. No.: 15/417,859

(22) Filed: Jan. 27, 2017

(65) Prior Publication Data
US 2017/0222667 A1 Aug. 3, 2017

Related U.S. Application Data

(60) Provisional application No. 62/288,850, filed on Jan. 29, 2016.

(51) Int. Cl.
*H04B 1/00* (2006.01)
*H04B 17/345* (2015.01)
(Continued)

(52) U.S. Cl.
CPC .......... *H04B 1/0057* (2013.01); *H04B 1/525* (2013.01); *H04B 17/345* (2015.01); *H04B 17/373* (2015.01); *H04B 17/354* (2015.01)

(58) Field of Classification Search
CPC .... H04B 1/0057; H04B 1/525; H04B 17/345; H04B 17/373; H04B 17/354
See application file for complete search history.

(56) References Cited

U.S. PATENT DOCUMENTS

| 4,327,446 A | 4/1982 | Dressler |
| 7,499,397 B1 | 3/2009 | Monk et al. |

(Continued)

FOREIGN PATENT DOCUMENTS

| WO | 2014/062933 A1 | 4/2014 |
| WO | 2017/123717 A1 | 7/2017 |

OTHER PUBLICATIONS

Shane Thomas (Authorized Officer), International Search Report and Written Opinion dated May 23, 2017, PCT Application No. PCT/US2017/015313, filed Jan. 27, 2017, pp. 1-10.

(Continued)

*Primary Examiner* — Ricky Q Ngo
*Assistant Examiner* — Stephen N Steiner
(74) *Attorney, Agent, or Firm* — MH2 Technology Law Group LLP

(57) ABSTRACT

The present disclosure provides methods and systems for mitigating signal noise. In implementations, the systems and methods perform operations including continuously determining an instantaneous power of a signal path. The operations also include determining a dynamic noise threshold by sampling the instantaneous power at different times and selecting a minimum of the instantaneous power sampled during the different times. The operations further include determining that the instantaneous power is less than the dynamic noise threshold. Additionally, the operations include blocking communication from the signal path. Further, the operations include iteratively updating the dynamic noise threshold.

20 Claims, 5 Drawing Sheets

(51) Int. Cl.
  *H04B 1/525*    (2015.01)
  *H04B 17/373*   (2015.01)
  *H04B 17/354*   (2015.01)

(56) References Cited

U.S. PATENT DOCUMENTS

| | | |
|---|---|---|
| 8,667,550 B2 | 3/2014 | Wang |
| 2007/0060186 A1* | 3/2007 | Ganesan ............... H04L 41/06 455/522 |
| 2010/0095344 A1 | 4/2010 | Newby et al. |
| 2010/0191525 A1* | 7/2010 | Rabenko ............... H04B 3/23 704/211 |
| 2010/0251320 A1 | 9/2010 | Shafer et al. |
| 2010/0251323 A1 | 9/2010 | Jackson |
| 2014/0105221 A1* | 4/2014 | Bailey ............... H04L 12/2801 370/420 |
| 2015/0208137 A1* | 7/2015 | Alrutz ............... H04N 21/6118 725/124 |
| 2017/0195126 A1 | 7/2017 | Brooks et al. |

OTHER PUBLICATIONS

Blaine R. Copenheaver (Authorized Officer), International Search Report and Written Opinion dated Sep. 21, 2018, PCT Application No. PCT/US2018/041861, filed Jul. 12, 2018, pp. 1-14.

* cited by examiner

DYNAMIC NOISE MITIGATION DEVICE

CROSS REFERENCE TO RELATED APPLICATIONS

This claims priority to U.S. Provisional Patent Application No. 62/288,850, filed Jan. 29, 2016, the content of which is incorporated herein in its entirety.

BACKGROUND

In cable systems and other transmission systems, sources of signal noise at a premise (e.g., a customer's home, a business location, etc.) have a dynamic nature. As such, the signal noise of that premise can change over time (e.g. hourly, daily, etc.). Current noise mitigation systems attempt to control signal noise by setting a noise threshold and blocking outgoing signals from premises when the noise is above the threshold. The noise threshold, however, is fixed regardless of the noise level and the signal level (e.g., signal-to-noise ratio). Such fixed thresholds can produce undesirable results. For example, the noise mitigation system may be activated even when a signal level is sufficiently high to communicate legitimate signal packets, but noise is above the fixed noise level threshold. Additionally, the noise mitigation system may not activate when there is low noise, but the signal level is not significantly higher than the noise level.

SUMMARY

The present disclosure provides systems and methods for dynamically mitigating ingress signal noise returned to a source from a local device at premises. A system consistent with the present disclosure includes a first diplexer connected to the source, and a second diplexer connected to the local device. The system also includes a forward signal path electrically connecting the first diplexer and the second diplexer that provides a forward signal from the source to the local device. The system further includes a return signal path electrically connecting the first diplexer and the second diplexer that provides a return signal from the local device to the source. The system further includes a switching and termination unit positioned in the return signal path that selectively opens and closes the return signal path. The system further includes a signal processing unit positioned within the return signal path that continuously determines an instantaneous power level of the return signal path. The signal processing unit also determines a dynamic noise threshold by selecting a minimum value of the instantaneous power level over a predetermined time period. The signal processing unit further determines whether the instantaneous power level of the return signal path is greater than the dynamic noise threshold. The signal processing unit further controls the switching and termination unit to close the return signal path when the instantaneous power level of the return signal is greater than the dynamic noise threshold, and controls the switching and termination unit to open the return signal path when the instantaneous power level of the return signal is not greater than the dynamic noise threshold.

A noise mitigation device consistent with the present disclosure includes a signal path that transmits a signal from the local device to a source. The device also includes a signal processing unit positioned within the signal path that continuously determines an instantaneous power of the signal path. The signal processing unit also iteratively determines a current dynamic noise threshold by selecting a minimum of the instantaneous power over a predetermined time period. The signal processing unit further determines whether the instantaneous power level exceeds the current dynamic noise threshold. The signal processing unit further allows transmission of the signal from the local device to the source on the signal path when the instantaneous power level exceeds the current dynamic noise threshold, and blocks transmission of noise to the source from the signal path when the instantaneous power level does not exceed the current dynamic noise threshold.

A method consistent with the present disclosure includes continuously determining an instantaneous power of a signal path. The method also includes determining a dynamic noise threshold by sampling the instantaneous power at different times and selecting a minimum of the instantaneous power sampled during the different times. The method further includes determining that the instantaneous power is less than the dynamic noise threshold. The method further includes blocking communication from the signal path. The method further includes iteratively updating the dynamic noise threshold.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical, and structural changes can be made to the examples of the various implementations without departing from the spirit and scope of the present teachings. The following detailed description is, therefore, not to be taken in a limiting sense and the scope of the present teachings is defined by the appended claims and their equivalents.

Systems and methods in accordance with the present disclosure mitigate signal noise (e.g., ingress noise) introduced, for example, to a cable television (CATV) network from equipment located in premises served by the network. According to aspects of the present disclosure, a noise mitigation system can be configured to monitor a communication path, to dynamically set noise thresholds within predetermined time periods by obtaining accurate estimates of the noise level and/or signal validity in the communication path during such time periods, and to actively mitigate the noise based on the dynamic noise thresholds. In implementations, the noise mitigation system can determine that a signal is communicated on a signal path (e.g., an upstream path or a return signal path) is valid when the signal exceeds a current (i.e., present) dynamic noise threshold. If a valid signal is detected, the noise mitigation system can allow transmission of the valid signal. On the other hand, if no valid signal is detected in the signal path (e.g., no signal in the signal path exceeds the dynamic noise threshold), then the noise mitigation device can mitigate noise by blocking (e.g., opening, terminating, or attenuating) the signal path. Additionally, if the current dynamic noise threshold is determined to be greater than a predetermined limit (e.g., an excessive noise threshold established by a CATV provider), the noise mitigation system can activate an indicator to provide an audio and/or visual alert of excessive noise.

Figure 1:
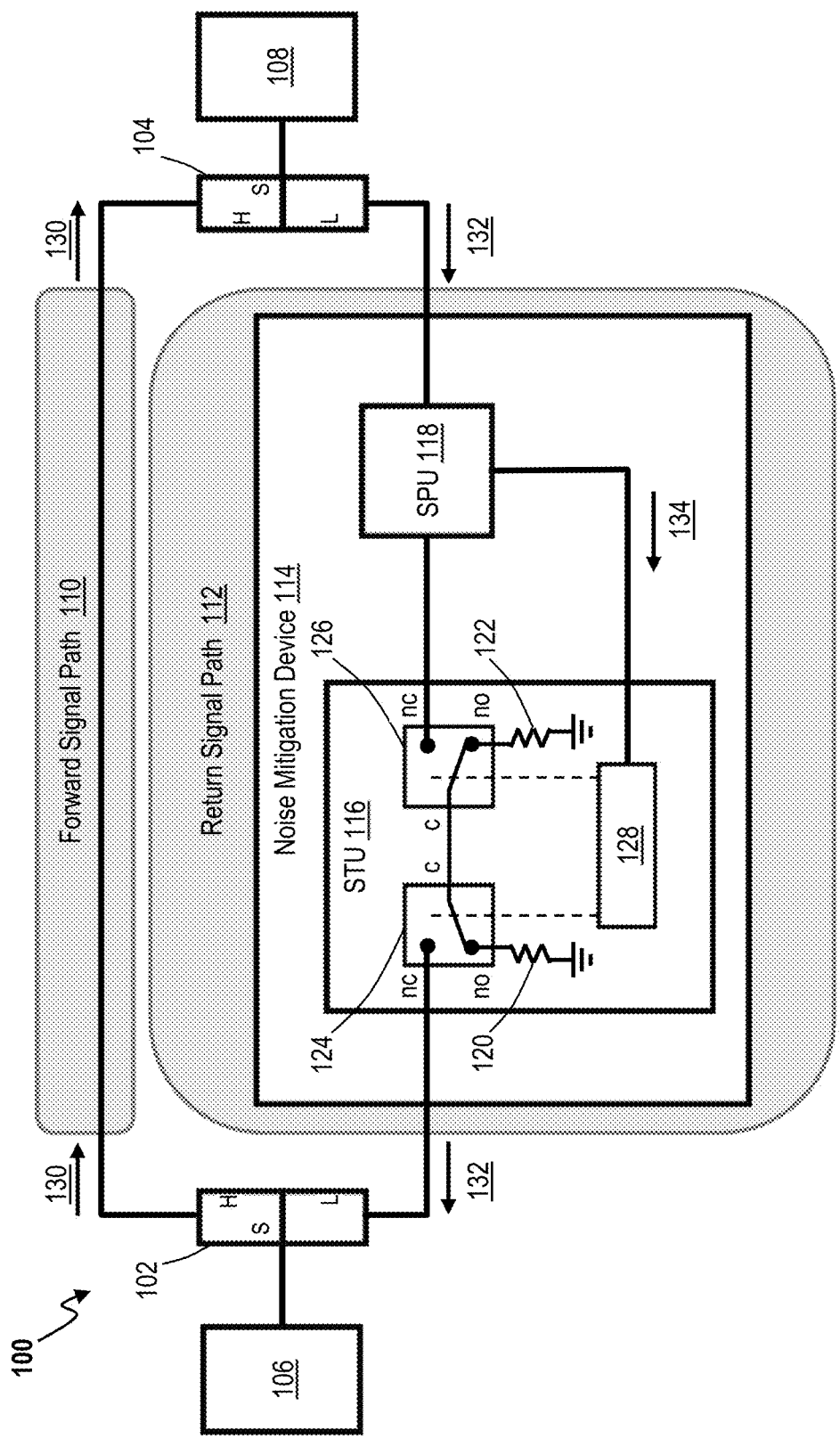
FIG. 1 is a functional block diagram illustrating an example of a noise mitigation system, according to various implementations.

FIG. 1 is a functional block diagram illustrating an example of a noise mitigation system 100, according to various implementations. The noise mitigation system 100 includes a diplexer 102, a diplexer 104, a forward signal path 110, a return signal path 112, and a noise mitigation device 114. The diplexer 102 and diplexer 104 can be passive devices that implement frequency-domain multiplexing. Each of the diplexers 102, 104 can include two ports, for example, low-pass (L) and high-pass (H), that can be multiplexed onto a common port (S) (e.g., an input and output port). The signals on the low-pass ports and the high-pass ports can occupy disjoint frequency bands. Thus, the signals on the low-pass and high-pass ports can coexist on input or output port without interfering with each other. For example, the high-pass port can be a high frequency port, and the low-pass port can be a low frequency port.

In the noise mitigation system 100, the common port of the diplexer 102 can be coupled to the source 106, which communicates signals (e.g. RF signals) to and from a local device 108. The source 106 can be any type of device or system that provides a signal to the local device 108. For example, the source could be a network of a CATV provider, a satellite provider, or the like. The local device 108 can be any type of device that receives and processes the signals from the source 106 and that communicates signals back to the source 106. For example, the local device 108 can be a CATV box, a satellite television receiver, a modem, and the like, which can be located at a premises a client of the CATV provider.

In some implementations, the high-pass port (H) of the diplexer 102 can be electrically coupled (e.g., via a conductor) to the high-pass port (H) of the diplexer 104 to form the forward signal path 110, which communicatively connects the source 106 to the local device 108. Additionally, the low-pass port (L) of the diplexer 102 can be electrically coupled to the low-pass port (L) of the diplexer 104 to form the return signal path 112, which communicatively connects the local device 108 to the source 106. The diplexer 102 and the diplexer 104 can isolate signals communicated on the forward signal path 110 from those on the return signal path 112. This isolation allows a return signal 132 communicated via the return signal path 112 to be processed by the noise mitigation device 114 without interfering with or damaging a forward signal 130 communicated via the forward signal path 110. For example, the forward signal path 110 can carry the forward signal 130 in a first frequency band (e.g., a high-band), and the return signal path 112 can carry the return signal 132 in a second frequency band (e.g., a low-band), which is substantially disjoint from the first frequency band.

The return signal path 112 can include the noise mitigation device 114 coupled between the low-pass port (L) of the diplexer 102 and the low-pass port (L) of the diplexer 104. The noise mitigation device 114 can be configured to set a dynamic noise threshold within predetermined time periods based on estimates of noise levels occurring during the predetermined time periods. When the return signal 132 is communicated on the return signal path 112, the noise mitigation device 114 can determine whether the signal exceeds the dynamic noise threshold, which indicates that a valid signal is present. Once a valid signal is detected, the noise mitigation device 114 can enable transmission of the valid signal to, e.g., the source 106. However, if the return signal 132 on the return signal path 112 drops below the dynamic noise threshold such that the return signal 132 is invalid, the noise mitigation device 114 can mitigate noise in the return signal path 112, thereby preventing or minimizing the effects of such noise on the source 106. Additionally, as described below, if the noise level measured exceeds a predetermined threshold, for example, defined by the source 106, the noise mitigation device 114 can activate an indicator (e.g., visual and/or audible) to provide an alert of the threshold being reached. This indicator can be utilized to alert by technicians that a particular premise may be experiencing unacceptable noise levels.

Implementations of the noise mitigation device 114 can include a switch and termination unit (STU) 116 and a signal processing unit (SPU) 118. As detailed herein, the signal processing unit 118 can be configured to monitor the return signal path 112, continuously determine availability and/or validity of the return signal 132, dynamically update a noise threshold, determine whether the return signal 132 exceeds the current dynamic noise threshold, and generate a control signal 134 that controls the switch and termination unit (STU) 116 to pass or mitigate the return signal 132.

Implementations of the signal processing unit 118, such as the example illustrated in FIG. 2 below, can be constructed using directional couplers, tap resistors, log detector, peak detector, operational amplifiers, comparators, field effect transistor (FET) switches, monostable multivibrators, memory circuits (e.g. flip-flops), sample and hold circuits, and light emitting diodes (LEDs). Other implementations may provide the functionality of such devices using a microcontroller (e.g., an application-specific integrated circuit).

As illustrated in FIG. 1, the switch and termination unit 116 can include resistors 120 and 122, switches 124 and 126 (e.g., relays), and a switch control 128. As noted above, the control signal 134 from the signal processing unit 118 can control the switch control 128 to select a state of the switch and termination unit 116. In an "ON" state, the signal processing unit 118 can configure the switches 124 and 126 of the switch and termination unit 116 to close the return signal path 112, such that the return signal 132 can pass from the local device 108 to the source 106 via the diplexers 102 and 104. In an "OFF" state, the signal processing unit 118 can control the switch control 128 to configure the switches 124 and 126 to open and/or terminate the return signal path 112, such that the return signal 132 is prevented from passing from the local device 108 to the source 106. In implementations, when in the OFF state, the switches 124 and 126 of switch and termination unit can be terminated to an electrical ground via the resistors 120 and 122 (e.g., 75 Ohm resistors).

In some implementations, the switches 124 and 126 can be single-pole, dual-throw ("SPDT") relays having respective common nodes ("c"), first nodes ("nc") and second nodes ("no"). The common nodes of the switches 124 and 126 can be connected to each other, the first nodes of the switches 124 and 126 can be respectively connected to the diplexers 102 and 104. The second poles of switches 124 and 126 can be respectively connected to electrical ground via resistors 120 and 122. Hence, when switch control 128 is controlled by the signal processing unit 119 (via control signal 134) to operate in the OFF state, the switch and termination unit 116 can terminate both ends of the return signal path 112 to the electrical ground via the second nodes (no) and the resistors 120 and 122. Further, when the switch control 128 is controlled by the control signal 134 to operate in the ON state, the switch and terminal unit 116 can connect both ends of the return signal path to each other via the first nodes (nc). As detailed below, the signal processing unit 118 can select the OFF state in situations in which it determines that the return signal path includes excessive noise and/or that the return signal path lacks a valid return signal 132 (or data packets) from the local device 108. Also, the signal processing unit 118 can select to the ON state in situations in which the return signal path 112 is determined to be communicating a valid return signal 132 (or data packets) from the local device 108.

While FIG. 1 illustrates various components contained in the noise mitigation system 100, it is understood that FIG. 1 provides one example of a noise mitigation system among many contemplated. Additional components and functionality can be added, and existing components can be, combined, rearranged, reconfigured, or removed. For example, the switches 124 and 126 can be reconfigured such that the common nodes (c) connect directly to the diplexers 102 and 104, the first nodes (nc) connect together, and the second nodes (no) terminate to ground such that low-pass ports (L) of the diplexers 102 and 104 are terminated when the noise mitigation device 114 is set to the OFF state.

Figure 2:
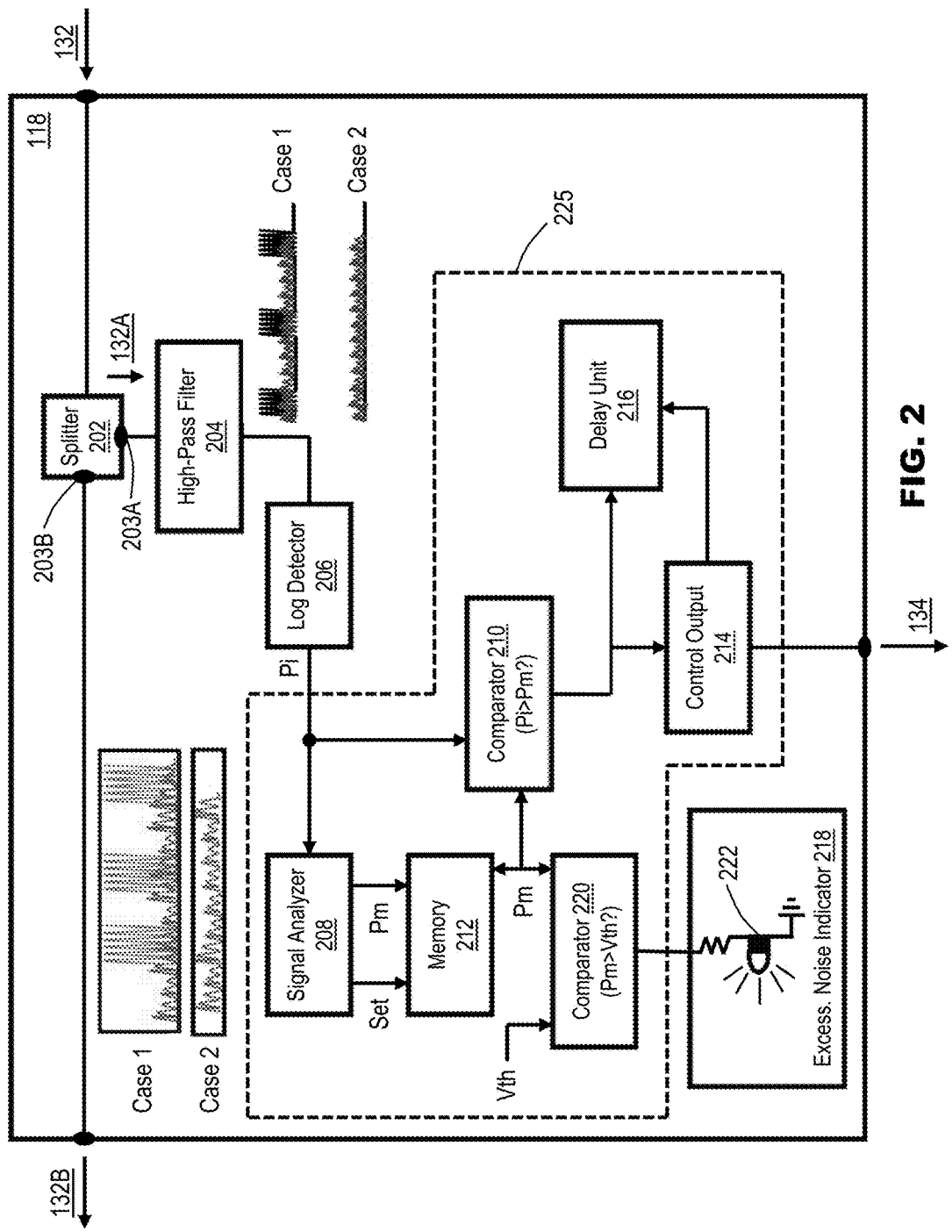
FIG. 2 is a functional block diagram illustrating an example of a signal processing unit, according to various implementations.

FIG. 2 illustrates an example of a signal processing unit 118, according to an implementation. The signal processing unit 118 can be the same or similar to that previously described herein. The signal processing unit 118 can include a signal splitter 202, which can be one or more devices configured to divert a first portion 132A (e.g., a minority portion) of a return signal 132 (e.g., from return path 112) for processing via an output port 203A, while allowing a second portion 132B (e.g., a majority portion) of the return signal 132 to pass via an output port 203B (e.g., to switching and termination unit 116). In some implementations, the signal splitter 202 can be a directional coupler or a tap resistor. The output port 203A of the signal splitter 202 can provide the return signal 132A to a high-pass filter 204.

The high-pass filter 204 can be one or more devices configured to filter signals below a predetermined frequency. For example, the high-pass filter 204 can filter frequencies below a start frequency of the return signal path 112 (e.g., 5 MHz). Additionally, the high-pass filter 204 can be a transition high-pass filter configured to ignore any unused or insignificant portion of the return signal 132A (e.g., below 10 MHz) to obtain an "interfering noise level," which can be stored as a noise level threshold. An output of the high-pass filter 204 can be coupled to an input of a log detector 206.

The log detector 206 can be one or more devices configured to process the return signal 132A filtered by the high-pass filter 204 to produce a signal "Pi," which can be a signal having a voltage representing a power level of the return signal 132A at an instant of time (i.e., an instantaneous power level). The signal Pi output from the log detector 206 can be provided to a signal analyzer 208 and a comparator 210.

The signal analyzer 208 can be one or more devices configured to process the signal Pi over a predetermined time period to determine a dynamic noise threshold "Pm." In implementations, the signal analyzer 208 continuously measures samples of the signal Pi and selects a minimum power level from among the samples measured over the predetermined time period, and sets the minimum value of the signal Pi as the noise level threshold Pm. By doing so, the signal analyzer 208 can predict an amount of noise in the return signal path 112. For illustration, FIG. 2 depicts two sets of samples of the signal Pi measured over a period of time. Case 1 represents a situation in which the signal Pi includes a valid signal and noise. Case 2 represents a situation in which the signal Pi only includes noise. In both Case 1 and Case 2, by selecting the minimum measured value of the signal Pi, the signal analyzer 208 can distinguish the noise portion from the valid portion of the signal Pi, such that a level of the noise portion is predicted and used to set the dynamic noise threshold Pm. The dynamic noise threshold Pm determined by the signal analyzer 208 can be output to a memory 212 for storage.

The memory 212 can be one or more devices configured to store the noise level threshold Pm determined by the signal analyzer 208. The memory 212 can store the noise level threshold Pm for a predetermined time period (e.g., about four hours). The memory 212 can output the current dynamic noise threshold Pm to comparator 210 and comparator 220. In implementations, the memory 212 can be a sample and hold circuit controlled by the signal analyzer 208. For example, the signal analyzer 208 can provide a "set" signal to the sample and hold circuit when the predetermined time expires. In response to the set signal, the sample and hold circuit can be updated with a current (i.e., present) dynamic noise threshold Pm provided by the signal analyzer 208.

The comparator 210 can be one or more devices configured to continuously compare the signal Pi from the log detector 206 with the dynamic noise threshold Pm stored by the memory 212. If the signal Pi exceeds than the dynamic noise threshold Pm, an output of comparator 210 can assume a digital logic level (e.g., either HIGH or LOW) indicating that the return signal path 112 has a valid signal. If the signal Pi does not exceed the noise level threshold Pm at a time instant, the output of comparator 210 can assume a different digital logic level (e.g., either LOW or HIGH) indicating that the return signal path has an invalid signal (e.g., only noise).

The output of the comparator 210 can be coupled to a control output 214, which can be configured to output a control signal 134 (e.g., for controlling the switches 124 and 126). For example, a HIGH digital logic state of the control signal 134 can allow transmission on the return signal path 112, and a LOW logic state of the control signal 134 can interrupt transmission on the return signal path 112. In implementations, the control output 214 can be a logic gate that selectively outputs the control signal 134 based on the output of the comparator 210

In implementations, a delay unit 216 can be coupled to outputs of the comparator 210 the control output 214 to provide a short delay before changing a state of the control signal 134 (provided, e.g., to switching and termination unit 116). This delay can allow a signal (or packets) transmitted via the return signal 132B to complete transmission before the return signal path 112 is switched to the OFF state. In some implementations, the delay unit 216 can be a monostable multivibrator have two states: a stable state and an unstable (transient) state. A trigger pulse output from the comparator 210 can cause the monostable multivibrator to enter the unstable state. Once in the unstable state, the monostable multivibrator can return to the stable state after a set time governed, e.g., by passive circuit components (e.g., resistors, capacitors, etc.) coupled to the monostable multivibrator In some implementations, the signal processing unit 118 can also include a comparator 220 that drives an excessive noise indicator 218, which can be, for example, a LED light and/or a buzzer 222. The comparator 220 can be configured to continuously compare the noise level threshold Pm from the memory 212 with an excessive noise threshold Vth. The excessive noise threshold Vth can be a predetermined value indicating a maximum acceptable noise level on the return signal path 112. For example, the excessive noise threshold Vth can be pre-established by the source 106 (or an operator thereof). If the noise level threshold Pm exceeds the excessive noise threshold Vth at a time instant, the output of the comparator 220 can assume a digital logic state (e.g., either HIGH or LOW), which activates the excessive noise indicator 218. If the noise level threshold Pm is below the excessive noise threshold Vth at a time instant, the output of the comparator 220 can assume a different digital logic state (e.g., either LOW or HIGH) indicating an acceptable noise level, and the excessive noise indicator 218 can deactivate.

While FIG. 2 illustrates various components that can be included in the signal processing unit 118, it is understood that implementations of the signal processing unit 118 can include additional components. Further, the various components and/or their functions can be, combined rearranged, reconfigured, or removed. For example, in implementations of the signal processing unit 118, the functionality of the signal analyzer 208, the comparator 210, the memory 212, the control output 214, the delay unit 216, and/or the comparator 220 can be provided by a microcontroller 225 (e.g., an application specific integrated circuit).

Figure 3A:
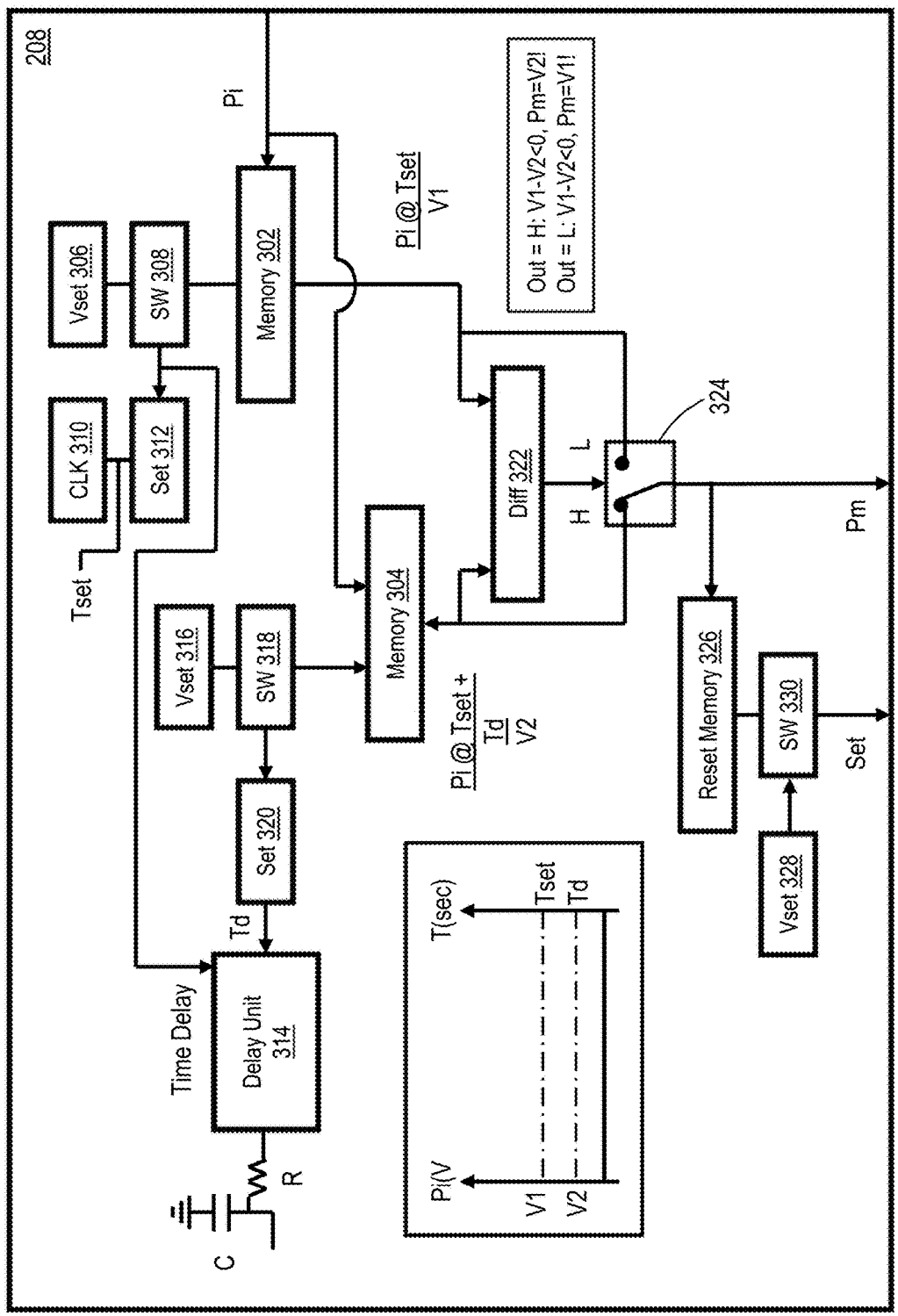
FIG. 3A is a functional block diagram illustrating an example of a decision circuit, according to various implementations.
Figure 3B:
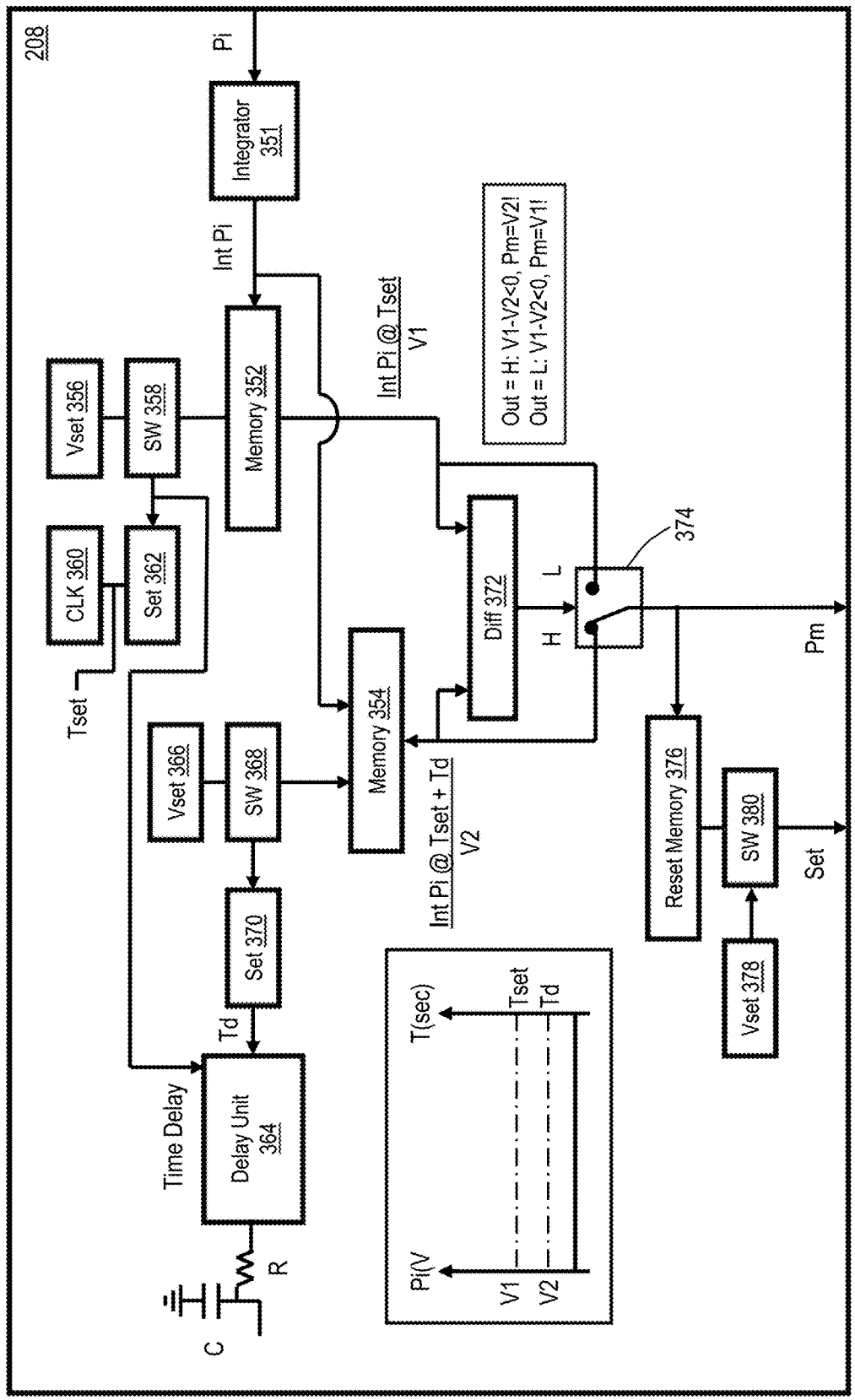
FIG. 3B is a functional block diagram illustrating an example of a decision circuit, according to various implementations.

FIGS. 3A and 3B are functional block diagrams illustrating examples of a signal analyzer 208, according to various implementations. The signal analyzer 208 illustrated in FIGS. 3A and 3B can be the same or similar to that previously describe herein. While FIGS. 3A and 3B illustrate various components contained in the signal analyzer 208, it is understood that components and functionality can be added, and existing components can be combined, rearranged, reconfigured, or removed.

Referring to FIG. 3A, the signal analyzer 208 can be configured to compare samples of the signal Pi. In some implementations, the signal analyzer 208 can be configured to sample the signal Pi at regular intervals. For example, at the regular intervals, the signal analyzer 208 can sample a first sample of Pi, "V1," and a second sample of Pi, "V2," separated by a time delay (e.g., about 5/1000 seconds). The signal analyzer 208 can be configured to compare V1 and V2, and select the minimum of the two samples as the noise level threshold Pm.

For example, the signal analyzer 208 can include a memory 302 and a memory 304. The memory 302 can be configured to capture and store the first sample V1 for each clocked time interval, "Tset." In some implementations, the memory 302 can be a sample and hold circuit coupled to a set signal unit, Vset, 306, a switch 308, a clock 310, a set circuit 312. Based on the time interval, Tset, from the clock 310 (e.g., 1 second), the set circuit 312 can activate a switch 308 to supply the Vset 306 to the memory 302. In response, the memory 302 can capture the signal Pi as the first sample V1.

The memory 304 can be configured to capture and store the second sample V2 at each time Tset plus a delay "Td" (e.g., 0.5 seconds). In some implementations, the memory 304 can be a sample and hold circuit coupled to a delay unit 314, a set signal unit, Vset, 316, a switch 318, a set circuit 320. The delay unit 314 (e.g., a monostable multivibrator) can be coupled to the set circuit 312 and provide the time delay Td before activating the set circuit 320. Based on the timing, Tset+Td, the set circuit 320 can activate the switch 318 to supply the Vset 316 to the memory 304. In response, the memory 304 can capture the signal Pi as the second sample V2.

The outputs of the memory 302 and the memory 304 can be coupled to a differentiator 322. The differentiator 322 can be configured to compare the first sample V1 and the second sample V2. In implementations, the differentiator 322 can be a differential circuit configured to output a digital logic signal (e.g., either a HIGH or LOW) signal indicating which of V1 and V2 has a minimum value. In some implementations, the differentiator 322 can determine which of V1 and V2 has a minimum value by determining the difference of V1 and V2 and determining if the difference is greater than zero. For example, the differentiator 322 can output a HIGH logic signal if the second sample V2 has a minimum value and can output a LOW logic signal if the second sample V1 has a minimum value.

The output of the differentiator 322 can be coupled to a switch 324. The switch 324 can be configured to switch between the output of the memory 302 and the output of the memory 304 based on the HIGH or LOW signal from the differentiator 322. For example, if the differentiator 322 outputs a HIGH signal, the switch 324 can connect the output of the memory 304 as the output of the signal analyzer 208, thereby setting the second sample V2 as the noise level threshold Pm. If the differentiator 322 outputs a LOW signal, the switch 324 can connect the output of the memory 302 as the output of the signal analyzer 208, thereby setting the second sample V1 as the noise level threshold Pm.

In some implementations, the signal analyzer 208 can also include a memory reset unit 326, a set signal unit Vset, 328, and a switch 330. In some implementations, each of the set signal units, Vset 328, Vset 316, and Vset 306 can be the same source, a different source, or combination thereof. The memory reset unit 326 can activate the switch 330 at the expiration of a predetermined time period to supply the Vset 328 to the memory 212 in the signal processing unit 118. In some implementations, the predetermined time period can be about four hours.

As illustrated in FIG. 3B, implementations of the signal analyzer 208 can be configured to compare two samples of the changes in the signal Pi. In such implementations, the signal analyzer 208 can include an integrator 351, which can be a circuit, for example, an OP amp circuit, that performs a time integration of the signal Pi. The integrator 351 can be configured to process the signal Pi and generate a signal ∫Pi. The signal analyzer 208 can be configured to sample the signal ∫Pi at regular intervals. For example, at the regular intervals, the signal analyzer 208 can sample a first sample, V1, and the second sample, V2, of the signal ∫Pi that have a time delay (e.g., about 5/1000 seconds). The signal analyzer 208 can be configured to compare the two samples, the first sample V1 and the second sample V2, and select the minimum of the two samples as the noise level threshold Pm.

For example, the signal analyzer 208 can include a memory 352 and a memory 354, which can be the same or similar to those described previously herein (e.g., memory 302 and memory 304). The memory 352 can be configured to capture and store the first sample V1 at each time, Tset. To activate the memory 352 (e.g., a sample and hold circuit), the memory 352 can be coupled to a set signal unit, Vset, 356, a switch 358, a clock 360, a set circuit 362. Based on the timing, Tset, of the clock 360, for example, one second, the set circuit 362 can activate a switch 358 to supply the Vset 356 to the memory 352. In response, the memory 352 can capture the signal ʃPi as the first sample V1.

The memory 354 can be configured to capture and store the second sample V2 at each time Tset plus a delay, Td, for example, 5/1000 seconds. To activate the memory 354 (implemented, e.g., as a sample and hold circuit), the memory 354 can be coupled to a delay unit 364 (e.g., a monostable multivibrator), a set signal unit, Vset, 366, a switch 368, and a set circuit 370. The delay unit 364 can be coupled to the set circuit 362 and provide the time delay Td before activating the set circuit 370. Based on the timing, Tset+Td, the set circuit 370 can activate the switch 368 to supply the Vset 366 to the memory 354. In response, the memory 354 can capture the signal ʃPi as the second sample V2.

The outputs of the memory 352 and the memory 354 can be coupled to a differentiator 372, which can be the same or similar to the differentiator 322 described above. The differentiator 372 can be configured to compare the first sample V1 and the second sample V2. The differentiator 372 can output a digital logic signal (e.g., either HIGH or LOW) signal indicating which of the first sample V1 and the second sample V2 has a minimum value. The differentiator 372 can determine which of the first sample V1 and the second sample V2 has a minimum value by determining the difference of the first sample V1 and the second sample V2 and determining if the difference is greater than zero. For example, the differentiator 372 can output a HIGH logic signal if the second sample V2 has a minimum value and can output a LOW logic signal if the second sample V1 has a minimum value.

The output of the differentiator 372 can be coupled to a switch 374. The switch 374 can be configured to switch between the output of the memory 352 and the output of the memory 354 based on the HIGH or LOW signal from the differentiator 372. For example, if the differentiator 372 outputs a HIGH signal, the switch 374 can connect the output of the memory 354 as the output of the signal analyzer 208, thereby setting the second sample V2 as the noise level threshold Pm. If the differentiator 372 outputs a LOW signal, the switch 374 can connect the output of the memory 352 as the output of the signal analyzer 208, thereby setting the second sample V1 as the noise level threshold Pm.

In some implementations, the signal analyzer 208 can also include a memory reset unit 376, a set signal unit, Vset, 378, and a switch 380, which can be the same or similar to those previously described herein (e.g., memory reset unit 326, set signal unit Vset, 328, and switch 330). In some implementations, each of the set signal units, Vset 378, Vset 366, and Vset 356 can be the same source, a different source, or combination thereof. The memory reset unit 376 can activate the switch 380 at the expiration of a predetermined time period to supply the Vset 378 to the memory 212 in the signal processing unit 118. For example, the predetermined time period can be four hours.

While certain examples of the noise mitigation device 114, including the switch and termination unit 116, the signal processing unit 118, and signal analyzer 208, are described above and illustrated in FIGS. 1, 2, 3A, and 3B, it is understood the functions of the noise mitigation device 114 may be implemented using other electrical components (e.g., analog to digital converters (A/D), microcontroller units, memory units, and the like), software, and combinations thereof.

Figure 4:
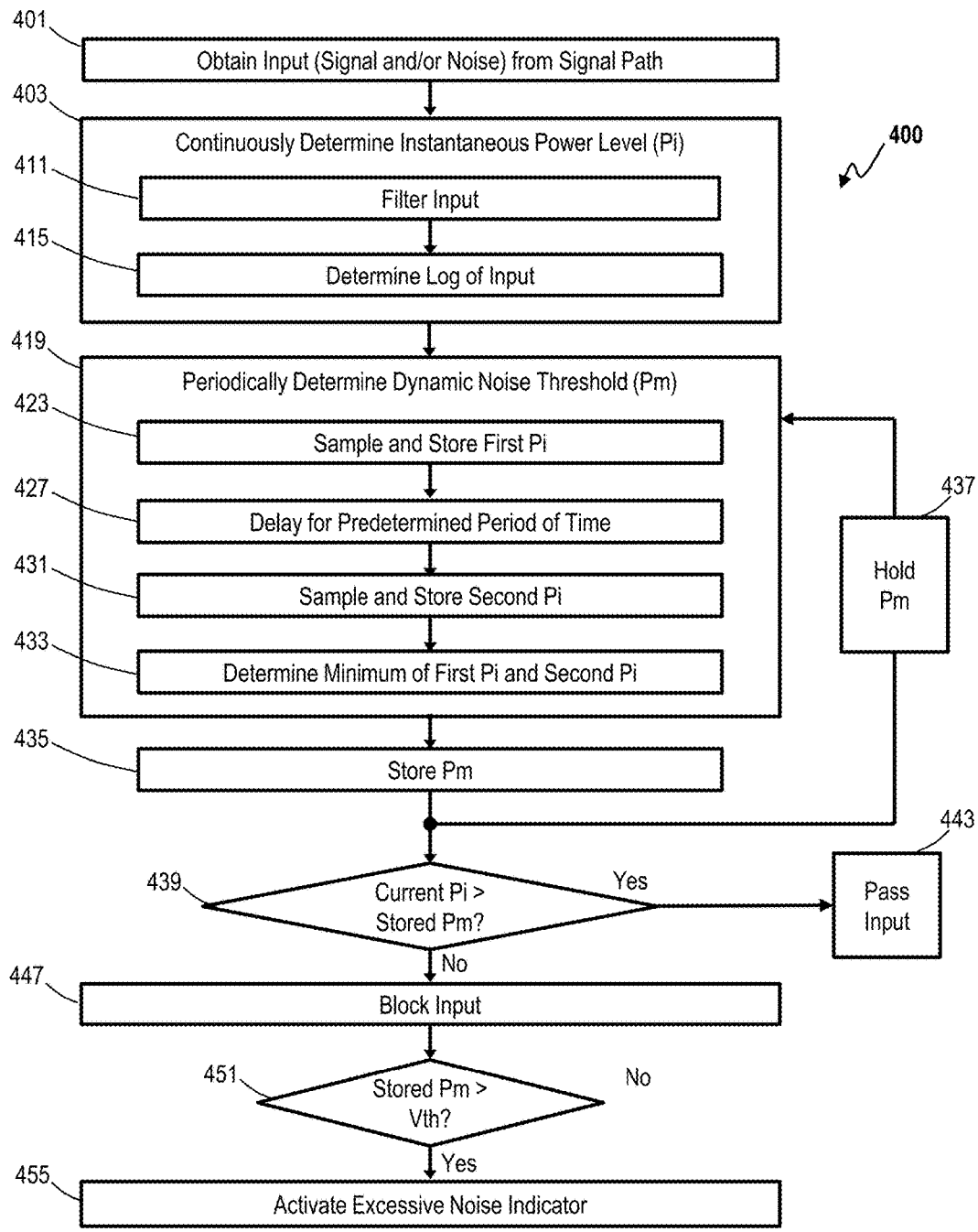
FIG. 4 is a flow diagram illustrating an example of a process for noise mitigation, according to an implementation.

The flow diagram in FIG. 4 illustrates an example of the functionality and operation of some possible implementations of systems and methods consistent with the present disclosure. Each block in the flow diagrams of FIG. 4 can represent a module, segment, or portion of program instructions, which includes one or more computer executable instructions for implementing the illustrated functions and operations. In some implementations, the functions and/or operations illustrated in a particular block of the flow diagram can occur out of the order shown in FIG. 4. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 4 is a flow diagram illustrating an example of a process 400 for a noise mitigation system (e.g., noise mitigation device 114), according to an implementation. At 401, a signal processing device (e.g., signal processing unit 118) obtains an input, which may include a communication signal (e.g., a return signal 132 including data packets) and/or noise (e.g., originating from a premises including a local device 108) provided by from a signal path (e.g., splitter device 202 in return signal path 112). At 403, the signal processing device continuously determines (e.g., updated with passage of time) an instantaneous power level (Pi) of the input obtained at 401. In implementations, determining the instantaneous power level at 403 can include, at 411, filtering the input obtained at 407 using a filter device (e.g., using high-pass filter 204). Determining the instantaneous power level at 403 can also include, at 415, determining a log of the input (e.g., using log detector 206).

At 419, the signal processing device periodically determines a dynamic noise threshold (Pm) using the instantaneous power levels (Pi) determined at 403 over a predetermined period of time. In implementations, determining the dynamic noise threshold at 419 can include, at 423, sampling and storing (e.g., using memory 302 or 352 of signal analyzer 208) a first value of the instantaneous power level (V1) continuously determined at 403. Determining the dynamic noise threshold at 419 can also include, at 427, delaying for the predetermined period of time (e.g., using delay unit 314 or 364) after determining the first value of the instantaneous power level at 423. Determining the dynamic noise threshold at 419 can further include, at 431, sampling and storing (e.g., using memory 304 or 354) a second value of the instantaneous power level (V2) continuously determined at 403. Additionally, determining the dynamic noise threshold at 419 can include, at 433, determining a minimum of the first value of the instantaneous power level (V1) and the second value of the instantaneous power level (V2) (e.g., using differentiator 322 or 372). This minimum determined at 433 can represent a prediction of noise in the signal path over the predetermined period of time of 427.

At 435, the signal processing unit stores dynamic noise threshold determined at 419 (e.g., using memory 212). At 437, the signal processing device holds the dynamic noise threshold determined at 419 for a predetermined period of time before iteratively updating it by returning to 419. As described previously, the noise within a premises may change over time (e.g. hourly, daily, etc.). Accordingly, the signal processing device can determine and periodically update the dynamic noise threshold. For example, at 437, the signal processing device hold the dynamic noise threshold for predetermined period of time (e.g., four hours). After expiration of the predetermined period, the signal processing device can determine an updated dynamic noise threshold that reflects the current noise in a premises.

At 439, the signal processing device (e.g., using comparator 210) determines whether a current value of the instantaneous power level being continuously determined at 403 is greater than the value of the dynamic noise threshold stored at 435. If the current value of the instantaneous power level is greater than the stored value of the dynamic noise threshold (i.e., 439 is "Yes"), then at 443 the signal processing device can output a control signal (from e.g., a HIGH logic signal from control output 214) to pass the input obtained 407. For example, as detailed previously herein, the signal processing device can output a logic signal (e.g., control signal 134) that selects an ON state of one or more relays (e.g., switches 124 and 126 of switching and termination unit 116). By doing so, a valid signal obtained as an input at 401 is permitted to pass from the signal path as detailed previously herein. However, if the current value of the instantaneous power level continuously determined at 403 is not greater than dynamic noise threshold stored at 435 (i.e., 439 is "No"), then at 447 the signal processing device can output a control signal (e.g., a LOW logic signal from control output 214) to block (or substantially attenuate) the communication of the input obtained 407 from the signal path. For example, as detailed previously herein, the signal processing device can output a logic signal (e.g., control signal 134) that selects an OFF state of one or more relays (e.g., switches 124 and 126 of switching and termination unit 116). By doing so the signal processing device mitigates (e.g., prevents or limits) noise passing from the signal path as detailed previously herein.

At 451 the signal processing device (e.g., using comparator 220) determines whether the current dynamic noise threshold determined at 419 exceeds a predetermined excessive noise threshold (Vth), which may be a value set by service provider (e.g., operator of source 106). If the signal processing device determines that the current dynamic noise threshold does not exceed the excessive noise threshold (i.e., 451 is "No"), then the excessive noise indicator is not activated. On the other hand, if the signal processing device determines that the current dynamic noise threshold is greater than or equal to the excessive noise threshold (i.e., 451 is "Yes"), then the process 400 can activate an excessive noise indicator (e.g., excessive noise indicator 218).

As described in process 400 above, the signal process unit continuously determines the instantaneous power level while periodically updating the dynamic noise threshold. Accordingly, the signal processing unit can dynamically pass or block signals on a signal path and/or activate the excessive noise indicator as the signal levels and noise in the signal path vary over time.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

What is claimed is:

1. A system for dynamically mitigating ingress signal noise returned to a source from a local device at a premises comprising:
    a first diplexer configured to connect to the source;
    a second diplexer configured to connect to the local device;
    a forward signal path electrically connecting the first diplexer and the second diplexer, and configured to provide a forward signal from the source to the local device;
    a return signal path electrically connecting the first diplexer and the second diplexer, and configured to provide a return signal from the local device to the source;
    a switching and termination unit positioned in the return signal path, and configured to selectively allow and block communication in the return signal path; and
    a signal processing unit positioned within the return signal path, and configured to:
        determine an instantaneous power level of the return signal path two or more times during a predetermined time period,
        iteratively determine a dynamic noise threshold by selecting a minimum value of the instantaneous power level during the predetermined time period,
        store the dynamic noise threshold for a subsequent predetermined time period that is longer than a time between consecutive times at which the instantaneous power level is determined,
        determine whether the instantaneous power level of the return signal path is greater than the dynamic noise threshold during the subsequent predetermined time period,
        control the switching and termination unit to allow communication in the return signal path when the instantaneous power level of the return signal is greater than the dynamic noise threshold, and
        control the switching and termination unit to block communication in the return signal path when the instantaneous power level of the return signal is not greater than the dynamic noise threshold.

2. The system of claim 1, wherein the minimum value of the instantaneous power level is used to predict a level of noise in the return signal over the predetermined period of time.

3. The system of claim 1 further comprising an excess noise indicator device configured to provide an alert when the dynamic noise threshold exceeds a predetermined excessive noise threshold.

4. The system of claim 3, wherein the alert is an audible alert, a visual alert, or a combination thereof.

5. A noise mitigation device comprising:
a signal path configured to transmit a signal from a local device to a source; and
a signal processing unit positioned within the signal path, and configured to:
determine an instantaneous power level of the signal path two or more times during a predetermined time period,
iteratively determine a dynamic noise threshold by selecting a minimum of the instantaneous power level during the predetermined time period, wherein the minimum of the instantaneous power level is used to predict a level of noise in the signal path during the predetermined time period,
store the dynamic noise threshold for a subsequent predetermined time period that is longer than a time between consecutive times at which the instantaneous power level is determined,
determine whether the instantaneous power level exceeds the dynamic noise threshold during the subsequent predetermined time period,
allow transmission of the signal from the local device to the source through the signal path when the instantaneous power level exceeds the dynamic noise threshold, and
block transmission of the noise to the source through the signal path when the instantaneous power level does not exceed the dynamic noise threshold.

6. The device of claim 5 further comprising an excessive noise indicator configured to provide an alert when the dynamic noise threshold exceeds a predetermined excessive noise threshold.

7. The device of claim 5, further comprising:
a second signal path configured to couple the local device to the source;
a first diplexer comprising a high-pass port and a low-pass port; and
a second diplexer comprising a high-pass port and a low-pass port, wherein:
the signal path is coupled to the low-pass port of the first diplexer and the low-pass port of the second diplexer, and
the second signal path is coupled to the high-pass port of the first diplexer and the high-pass port of the second diplexer.

8. The device of claim 7, wherein the switch and termination unit comprises:
a first switch coupled to the low-pass port of the first diplexer; and
a second switch coupled to the low-pass port of the second diplexer,
wherein:
the first switch and the second switch are configured to couple the first diplexer to the second diplexer via the signal path when the instantaneous power level exceeds the dynamic noise threshold, and
the first switch and the second switch are configured to block communication via the signal path when the instantaneous power level does not exceed the current noise threshold.

9. The device of claim 7, wherein the signal processing unit further comprises:
at least one memory configured to store a first sample of the instantaneous power level at a first time and store a second sample of the instantaneous power level at a second time, wherein the second time is delayed by an amount from the first time; and
a differential circuit coupled to the at least one memory, and configured to:
determine a smaller instantaneous power level of the first sample and the second sample, and
output the smaller instantaneous power level as the dynamic noise threshold.

10. The device of claim 9, wherein the signal processing unit further comprises:
a timing source coupled to the at least one memory, and configured to activate the at least one memory to store the first sample of the instantaneous power level at the first time; and
a second timing source coupled to the at least one memory, and configured to activate the at least one memory to store the second sample of the instantaneous power level at second first time.

11. The device of claim 10, wherein the second timing source comprises a monostable multivibrator configured to provide a delay from the first time.

12. The device of claim 9, wherein the signal processing unit further comprises an integrator circuit coupled to the at least one memory, the integrator circuit being configured to determine the first sample of the instantaneous power level and the second sample of the instantaneous power level.

13. The device of claim 5, wherein the signal processing unit further comprises a log detector coupled the signal path and configured to determine the instantaneous power level of the signal path.

14. The device of claim 5, wherein the signal processing unit further comprises an excessive noise indicator circuit configured to provide an alert when the dynamic noise threshold exceeds a predetermined excessive noise threshold.

15. The system of claim 1, wherein the signal processing unit comprises a delay unit configured to provide a delay before controlling the switching and termination unit to block communication in the return signal path, and wherein the delay allows the return signal to complete transmission before communication in the return signal path is blocked.

16. The system of claim 1, wherein the time between consecutive times at which the instantaneous power level is determined is less than one second, and wherein the subsequent predetermined time period is greater than one second.

17. The system of claim 16, wherein the signal processing unit is configured to determine whether the instantaneous power level exceeds the stored dynamic noise threshold multiple times during the subsequent predetermined time period.

18. The device of claim 5, wherein the time between consecutive times at which the instantaneous power level is determined is less than one second, and wherein the subsequent predetermined time period is greater than one hour.

19. The device of claim 18, wherein the signal processing unit is configured to determine whether the instantaneous power level exceeds the stored dynamic noise threshold multiple times during the subsequent predetermined time period.

20. A system for dynamically mitigating ingress signal noise returned to a source from a local device at a premises comprising:

a first diplexer configured to connect to the source;
a second diplexer configured to connect to the local device;
a forward signal path electrically connecting the first diplexer and the second diplexer, and configured to provide a forward signal from the source to the local device;
a return signal path electrically connecting the first diplexer and the second diplexer, and configured to provide a return signal from the local device to the source;
a switching and termination unit positioned in the return signal path, and configured to selectively allow and block communication in the return signal path; and
a signal processing unit positioned within the return signal path, and configured to:
   determine an instantaneous power level of the return signal path two or more times during a predetermined time period,
   iteratively determine a dynamic noise threshold by selecting a minimum value of the instantaneous power level during the predetermined time period, wherein the minimum value of the instantaneous power level is used to predict a level of noise in the return signal during the predetermined time period,
   store the dynamic noise threshold for a subsequent predetermined time period that is longer than a time between consecutive times at which the instantaneous power level is determined,
   determine whether the instantaneous power level of the return signal path is greater than the stored dynamic noise threshold multiple times during the subsequent predetermined time period,
   control the switching and termination unit to allow communication in the return signal path when the instantaneous power level of the return signal is greater than the dynamic noise threshold, and
   control the switching and termination unit to block communication in the return signal path when the instantaneous power level of the return signal is not greater than the dynamic noise threshold, wherein a delay is provided before blocking communication in the return signal path, and wherein the delay allows the return signal to complete transmission before communication in the return signal path is blocked.

* * * * *